United States Patent Office 3,543,306
Patented Nov. 24, 1970

3,543,306
OXALIC ACID DIAMIDE STABILIZERS FOR POLYOLEFINS
Hans Rudolf Biland, Gelterkinden, Switzerland, assignor to Ciba Limited, Basel, Switzerland, a company of Switzerland
No Drawing. Filed Sept. 23, 1968, Ser. No. 761,829
Claims priority, application Switzerland, Oct. 6, 1967, 14,012/67
Int. Cl. C08f 45/60
U.S. Cl. 260—45.8      5 Claims

ABSTRACT OF THE DISCLOSURE

The invention concerns stabilizers for polyolefins especially against ultraviolet radiation, heat and oxidation. The stabilizers are oxalic acid diamides of the formula (1) 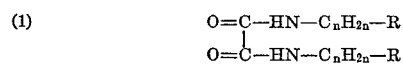

in which R represents a dialkylamino group, a di-(hydroxyalkyl)-amino group, or a saturated heterocyclic monocyclic residue which is linked with the group —$C_nH_{2n}$— through a nitrogen atom that is bound exclusively to carbon, and $n=2$ or a greater digit.

---

The present invention provides stabilizers for polyalkylenes. These stabilibers are oxalic acid diamides of the formula (1) 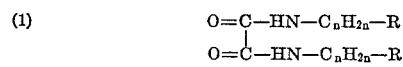

in which R represents a dialkylamino group whose alkyl residues contain 1–6 carbon atoms each or a di-(hydroxyalkyl)-amino group whose hydroxyalkyl residues contain 2–4 carbon atoms each, or a saturated heterocyclic monocrylic residue which is linked with the group —$C_nH_{2n}$— through a nitrogen atom that is bound exclusively to carbon, and contains as further cyclic members 4 or 5 carbon atoms and as many oxygen atoms or further nitrogen atoms as are needed to make the number of cyclic members 5 or 6, and $n=2$ or a greater digit.

The alkylene residue —$C_nH_{2n}$— may be linear or branched and contains at least 2, for example up to 5 carbon atoms. Preferred alkylene residues are those with 2 or 3 carbon atoms, that is to say the ethylene or n-propylene residue and the two possible methylethylene residues.

For the residue R there are the three possibilities mentioned above. In the simplest case R is a dialkylamino group whose alkyl residues contain 6, for example, 1–4 carbon atoms each. Alkyl residues with more than 2 carbon atoms may be branched but they are preferably linear. As examples there may be mentioned methyl, ethyl, propyl, isopropyl, butyl and tertiary butyl groups. Furthermore, R may be a di-(hydroxyalkyl)-amino group whose hydroxyalkyl residues each contains 2–4, preferably 2 carbon atoms. A relevant example is especially the di-(β-hydroxyethyl)-amino group. Finally, R may also be a heterocyclic residue, containing a single ring with at least one nitrogen atom as cyclic member which itself is linked, on one hand, with the —$C_nH_{2n}$— group and, on the other hand, with two cyclic carbon atoms. The hetero ring consists of a total of 5 or 6 cyclic members and contains in addition to the said nitrogen atom 4 or 5 carbon atoms and as many oxygen atoms or further nitrogen atoms as cyclic members to reach the above-mentioned number of 5 or 6. Accordingly, 5-membered rings must consist of the nitrogen atom and 4 carbon atoms, and 6-membered rings of the nitrogen atom and 5 carbon atoms, or of the nitrogen atom, 4 carbon atoms and an oxygen atom or of the nitrogen atom linked with the group —$C_nH_{2-n}$—, 4 carbon atoms and a further nitrogen atom. When the 6-membered ring contains two hetero atoms (2 N or N+O), they are preferably in the 1,4-position. The hetero ring is saturated, that is to say all cyclic members are linked together through simple bonds.

Particularly suitable for the present purposes are compounds of the formula (2) 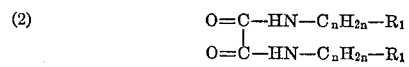

in which $n$ has the above meaning and $R_1$ is one of the residues of the following formulae:

(2.1) 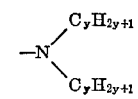

in which $y$ is a digit from 1 to 6, or (2.2) 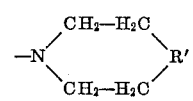

in which $R'$ is a direct bond, a group —$CH_2$—, an oxygen atom, an —NH— group or an —N(alkyl)— group, especially an —N($CH_3$)— group.

Especially preferred in this connection are the compounds of the formula (3) 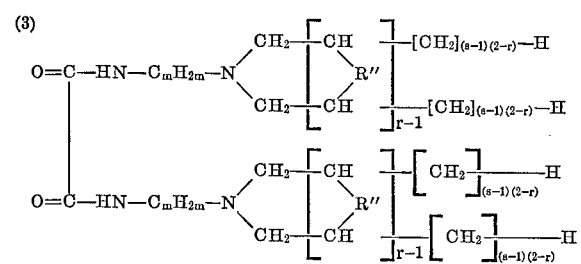

in which $R''$ is a direct bond, a —$CH_2$— group, an —($H_3C$)N— group, an —HN— group or preferably an oxygen atom, and $m=2$ or 3, $r=1$ or 2 and $s=1, 2, 3$ or 4.

Some compounds of the Formulae 1 to 3 are known and can in general be manufactured by known methods. The following manufacturing processes are especially suitable:

(1) Reaction of an oxalic acid diester, especially an oxalic acid dialkyl ester containing lower alkyl groups, for example the dimethyl or diethyl ester, with an amine of the formula (4) 

where R and $n$ have the above meanings, in the presence or absence of a solvent that is inert towards the reactants, at a temperature from 50 to 200° C.

(2) Reaction of oxalic acid with an amine of the Formula 4 in a melt.

(3) Reaction of oxalic acid dichloride with an amine of the Formula 4 in the presence or absence of a solvent that is inert towards the reactants, if desired in the presence of an acid acceptor.

For all these methods an amine of the Formula 4 is required as starting material, and for the manufacture of the oxalic acid diamides to be used in this invention it is possible to use, for example, the following amines:

1-amino-2-dimethylaminoethane,
1-amino-3-dimethylaminopropane,
1-amino-1-methyl-2-dimethylaminoethane,
1-amino-2-diethylaminoethane,
1-amino-3-diethylaminopropane,
1-amino-1methyl-diethylaminobutane,
1-amino-2-diisophopylaminoethane,
1-amino-3-di-n-butylaminopropane,
1-amino-3-di-(β-hydroxyethyl)-aminopropane,
N-(2-aminoethyl)-morpholine,
N-(3-aminopropyl)-morpholine,
N-(3-aminopropyl)-piperidine,
N-(2-aminoethyl)-piperidine,
N-(3-aminopropyl)-N'-methylpiperazine,
N-(2-aminoethyl)-pyrrolidine.

According to this invention the oxalic acid diamides of the Formulae 1 to 3 are used as stabilizers for polyalkylenes such as polyethylene. They are particularly suitable as stabilizers for polypropylene. To stabilize the polyalkylenes the oxalic acid diamides, advantageously in an amount from 0.1 to 5%, preferably from 0.1 to 0.5%, are finely and evenly distributed in them. The oxalic acid diamides may be added to the substances to be stabilized in the usual manner, for example before, during or after the polymerization, or before or during processing or shaping. For example, the powdered oxalic acid diamides may be evenly mixed with the polymers which, prior to the shaping operation, are in form of granules or chips. In some cases an even distribution can also be achieved by rolling the oxalic acid diamides into the polymers. The oxalic acid diamides exert a prolonged stabilizing effect especially in polypropylene, and the damage to the material otherwise caused by oxygen and especially by light, which makes the material brittle, and often also the discoloration due to the same causes, do not occur for a long time. In some cases a particularly good protective effect can be obtained by using the oxalic acid diamides in combination with other protective agents which distinctly antagonize the influence of ultraviolet rays and the oxidation.

Parts and percentages in the following manufacturing instruction and the examples are by weight.

MANUFACTURING INSTRUCTION 14.6 parts of oxalic acid diethyl ester and 26 parts of 1-amino-3-diethylaminopropane in 100 parts of methanol are refluxed for 3 hours (at 65° C.). The batch is then evaporated to dryness under a water jet vacuum, to leave 31 parts of the compound of the formula

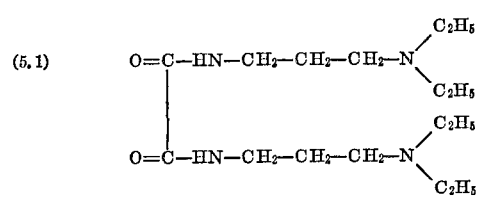

in form of white crystals. After one recrystallization from petroleum ether the product is analytically pure and melts at 48–49° C.

In an identical manner the oxalic acid diamides of the formula

with the residues $R_2$ mentioned below can be prepared from oxalic acid diethyl ester and the diamines of the formula $H_2N\text{---}R_2$:

| Formula No. | Residue —$R_2$ | M.P. of diamide. °C. |
|---|---|---|
| 5.2 | —CH$_2$—CH$_2$—CH$_2$—N(CH$_3$)$_2$ | 100–101 |
| 5.3 | —CH$_2$—CH$_2$—CH$_2$—N[(CH$_2$)$_3$—CH$_3$]$_2$ | 50–51 |
| 5.4 | —CH$_2$—CH$_2$—CH$_2$—N(CH$_2$—H$_2$C)$_2$O (morpholino) | 125–126 |
| 5.5 | —CH$_2$—CH$_2$—N(CH$_3$)$_2$ | 122–123 |
| 5.6 | —CH$_2$—CH$_2$—N(C$_2$H$_5$)$_2$ | 41–43 |
| 5.7 | —CH$_2$—CH$_2$—N[CH(CH$_3$)$_2$]$_2$ | 77–78 |
| 5.8 | —CH$_2$—CH(CH$_3$)—N(CH$_3$)$_2$ | 106–108 |
| 5.9 | —CH(CH$_3$)—CH$_2$—CH$_2$—CH$_2$—N(C$_2$H$_5$)$_2$ | 52–53 |
| 5.10 | —CH$_2$—CH$_2$—CH$_2$—N(CH$_2$—H$_2$C)$_2$CH$_2$ (piperidino) | 116–117 |
| 5.11 | —CH(CH$_3$)—CH$_2$—N(CH$_3$)$_2$ | 114–115 |
| 5.12 | —CH$_2$—CH$_2$—N(CH$_2$—CH$_2$)$_2$ (pyrrolidino) | 170–171 |
| 5.13 | —CH$_2$—CH$_2$—CH$_2$—N(CH$_2$—H$_2$C)$_2$N—CH$_3$ (N-methylpiperazino) | 131–131 |
| 5.14 | —CH$_2$—CH$_2$—N(CH$_2$—H$_2$C)$_2$NH (piperazino) | 148–150 |
| 5.15 | —CH$_2$—CH$_2$—N(CH$_2$—H$_2$C)$_2$O (morpholino) | 175–176 |

EXAMPLE 1

A mixture of 100 parts of polypropylene (Shell KM 61) and 0.5 part of one of the compounds listed in following Table A is turned into a sheet on a calender for 3 minutes at 170° C. The sheet is then pressed for 3 minutes at 230 to 240° C., under a maximum pressure of 40 kg./cm.[2] to form a panel of 1 mm. thickness.

The panel thus obtained is much more stable towards ultraviolet light (after 500 hours in a Fadeometer) than polypropylene that does not contain the compound used above.

Table A lists the values found, where with reference to the mechanical properties of the treated polypropylene 0 means brittle
+ means minor fissures
++ means no change with reference to colour
+ means slight yellowing
++ means no change Polypropylene that contains none of the compounds mentioned turns brittle after only 300 hours' exposure in a Fadeometer (value: 0).

| | Value after 500 hours in a fadeometer ||
|---|---|---|
| | Mechanical properties | Colour |
| Compound of formula: | | |
| (5.2) | ++ | ++ |
| (5.4) | ++ | + |
| (5.5) | + | ++ |
| (5.6) | ++ | ++ |
| (5.7) | ++ | ++ |
| (5.8) | + | + |
| (5.9) | + | ++ |
| (5.10) | + | ++ |
| (5.11) | ++ | ++ |
| (5.12) | + | + |
| (5.13) | ++ | + |
| (5.14) | ++ | + |
| (5.15) | + | + |
| Polypropylene [1] | 0 | + |

[1] Without addition of any of the above-mentioned compounds.

EXAMPLE 2

When the procedure used is as described in Example 1, except that polypropylene not previously stabilized (Profax, Hercules Powder) is used, the following values are obtained after 500 Fadeometer hours for the compound of the Formula 5.7:

Mechanical properties: ++
colour: +

The compounds of the Formulae 5.2 and 5.3 behave in a similar manner.

EXAMPLE 3

Polypropylene panels, freshly prepared according to Example 2, are cut up into chips. 5 grams each of these chips are heated to 160° C. under pure oxygen in a reactor tube connected with an absolute pressure gauge, and the pressure drop as a function of the time is recorded as a graph. The gaseous oxidation products formed are removed from the gas phase by means of a Linde molecular sieve 5 A. and solid potassium hydroxide so that the pressure measured corresponds to the residual pure oxygen. The following Table B shows for the antioxidative effect of the compounds added the time which elapses until a strong oxygen consumption (steep rise of the graph) appears (= induction time).

TABLE B

| Compound added: | Induction time in minutes, at 160° C. |
|---|---|
| nil | 2 |
| Compound of the Formula 5.4 | 30 |
| Compound of the Formula 5.6 | 16 |
| Compound of the Formula 5.7 | 68 |
| Compound of the Formula 5.13 | 20 |
| Compound of the Formula 5.14 | 17 |
| Compound of the Formula 5.15 | 10 |

EXAMPLE 4

When according to Example 2 polypropylene panels are manufactured which contain oxalic acid diamides and commercial ultraviolet absorbers or antioxidants according to Table C, an improvement of the stability towards the effect of ultraviolet light is observed.

The stability is evaluated according to the same scale as has been described in Example 1.

TABLE C

Composition of the commercial UV-absorbers or antioxidants:

Additive A—2-(2'-hydroxy-3',5'-di-tertiary butylphenyl)-5-chlorobenzotriazole
Additive B—condensation product of 3 mols of 3-methyl-6-tertiary butylphenol with 1 mol of crotonic aldehyde
Additive C—2,6-di-tertiary butyl-p-cresol
Additive D—$\beta,\beta'$-thiodipropionic acid dilauryl ester

| Additives | Concentration in percent | Value after 500 fadeometer hours ||
|---|---|---|---|
| | | Mechanical properties | Colour |
| Nil | | 0 | + |
| Additive A | 0.5 | + | + |
| Additive A | 0.25 | ++ | ++ |
| Compound (5.2) | 0.25 | | |
| Additive A | 0.25 | ++ | ++ |
| Compound (5.6) | 0.25 | | |
| Additive B | 0.2 | 0 | + |
| Additive C | 0.2 | 0 | + |
| Additive B | 0.2 | + | + |
| Compound (5.8) | 0.3 | | |
| Additive B | 0.2 | + | + |
| Compound (5.9) | 0.3 | | |
| Additive C | 0.2 | ++ | ++ |
| Compound (5.7) | 0.3 | | |
| Additive C | 0.2 | + | + |
| Compound (5.8) | 0.3 | | |
| Additive C | 0.2 | + | + |
| Compound (5.9) | 0.3 | | |
| Additive C | 0.2 | | |
| Additive D | 0.3 | ++ | ++ |
| Compound (5.2) | 0.5 | | |
| Additive C | 0.2 | | |
| Additive D | 0.3 | ++ | + |
| Compound (5.4) | 0.5 | | |

EXAMPLE 5

A mixture of 100 parts of polypropylene (Shell KM 61) and 0.5 part of the compound of the Formula 5.1 is turned into a sheet on a calender at 170° C. and is then pressed at 230 to 240° C. under a maximum pressure of 40 kg./cm.$^2$ to form a panel 1 mm. thick.

When the resulting panel is exposed to UV-light (500 fadeometer hours) it displays no change compared with unexposed polypropylene insofar as its colour or mechanical properties are concerned. On the other hand, polypropylene that does not contain the compound of the Formula 5.1, turns brittle after only 300 hours in a fadeometer.

I claim:
1. A composition of matter substantially consisting of polyolefins selected from the group consisting of polyethylene and polypropylene having incorporated therein as stabilizer a stabilizing amount of an oxalic acid diamide of the formula

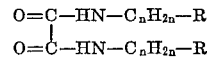

in which R represents:
a dialkylamino group whose alkyl residues contain 1–6 carbon atoms, a di-(hydroxyalkyl)-amino group whose hydroxylkyl residues contain 2–4 carbon atoms each, or a saturated heterocyclic monocyclic residues which is linked with the group —$C_nH_{2n}$— through a nitrogen atom linked exclusively to carbon and contains as further cyclic member 4 or 5 carbon atoms and as many oxygen atoms or further nitrogen atoms as are needed to make the number of cyclic members 5 or 6, and $n$ is 2 or a greater digit.

2. A composition as claimed in claim 1, having incorporated therein as stabilizer a stabilizing amount of an oxalic acid diamide of the formula

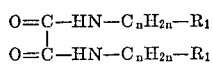

in which $R_1$ represents the residue

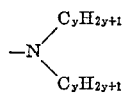

where $y$ is a digit from 1 to 6, or

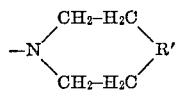

in which $R'$ is a direct bond, a —$CH_2$— group, an oxygen atom, an —NH— group or an —N—alkyl group containing 1 or 2 carbon atoms, and $n$ is 2 or a greater digit.

3. A composition as claimed in claim 1, having incorporated therein as stabilizer a stabilizing amount of an oxalic acid diamide of the formula

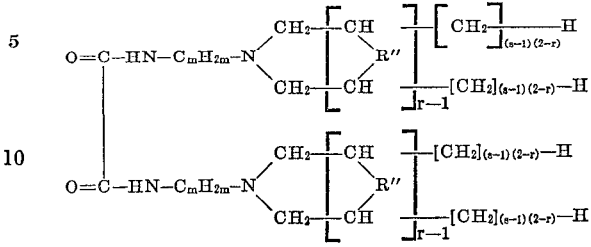

in which $R''$ represents a direct bond, a —$CH_2$— group, an —$(H_3C)N$— group, an —NH— group or an oxygen atom, $m=2$ or 3, $r$ is 1 or 2 and $s$ is 1, 2, 3 or 4.

4. A composition of matter as claimed in claim 1, substantially consisting of polypropylene and having incorporated therein as stabilizer a stabilizing amount of an oxalic acid diamide as defined in any one of claims 1, 2 or 3.

5. A composition of matter as claimed in claim 1, wherein said stabilizer is incorporated in an amount of from 0.1 to 5% by weight, calculated on the total amount of polyolefin.

References Cited
UNITED STATES PATENTS

| | | | |
|---|---|---|---|
| 3,462,517 | 8/1969 | Hansen et al. | 260—45.9 |
| 3,484,285 | 12/1969 | Hansen | 260—45.9 |
| 3,484,393 | 12/1969 | Ham | 260—45.9 |
| 3,255,150 | 6/1966 | Green | 260—45.8 |

FOREIGN PATENTS 927,977   6/1963   Great Britain.

HOSEA E. TAYLOR, Primary Examiner

U.S. Cl. X.R.

260—45.9, 45.85, 45.95, 247.2, 268, 294, 326.3, 561